US006538077B1

(12) United States Patent
Shveima et al.

(10) Patent No.: US 6,538,077 B1
(45) Date of Patent: Mar. 25, 2003

(54) POLYMERIZATION CATALYST SYSTEMS, METHODS OF MAKING AND USES THEREFOR

(75) Inventors: Joseph S. Shveima, Bartlesville, OK (US); Max P. McDaniel, Bartlesville, OK (US); Shirley J. Martin, Bartlesville, OK (US); Kathy S. Collins, Bartlesville, OK (US); Elizabeth A. Benham, Bartlesville, OK (US); Anthony P. Eaton, Dewey, OK (US); Ashish M. Sukhadia, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/434,852

(22) Filed: Nov. 4, 1999

(51) Int. Cl.$^7$ .................................................. C08F 4/24
(52) U.S. Cl. ........................ 526/106; 502/256; 502/234; 502/254; 526/129
(58) Field of Search ................................. 502/256, 234, 502/254; 526/106

(56) References Cited

U.S. PATENT DOCUMENTS

| | | | | |
|---|---|---|---|---|
| 4,397,762 A | * | 8/1983 | Johnstone | 252/429 |
| 4,681,866 A | * | 7/1987 | McDaniel et al. | 502/154 |
| 4,818,800 A | * | 4/1989 | McDaniel et al. | 526/106 |
| 4,877,763 A | | 10/1989 | McDaniel et al. | 502/117 |
| 5,171,801 A | | 12/1992 | Martin et al. | 526/106 |
| 5,426,082 A | | 6/1995 | Marsden | 502/235 |
| 5,599,887 A | * | 2/1997 | Bradley et al. | 526/105 |
| 5,714,424 A | | 2/1998 | Warthen et al. | 502/105 |

* cited by examiner

Primary Examiner—David W. Wu
Assistant Examiner—William K. Cheung

(57) ABSTRACT

A novel magnesium treated silica-containing compound that is useful as a support for chromium based olefin polymerization catalyst systems is provided which produces ethylene polymers having with MWD's that promote good properties particularly in HMW film applications.

12 Claims, No Drawings

POLYMERIZATION CATALYST SYSTEMS, METHODS OF MAKING AND USES THEREFOR

This invention relates to polymerization catalyst systems and polymerization processes.

Supported chromium oxide catalyst systems long have been used to prepare olefin polymers in hydrocarbon solution or slurry processes to give products having excellent characteristics from many standpoints. A number of supports have been broadly disclosed in the art for the support of chromium oxide catalyst systems including, silica, alumina, boria, zirconia, silica-alumina, and other refractory metals. In order to obtain a polymer product with easy processing characteristics, catalyst systems preferably have a low pore volume and high surface area. Generally, it is recognized that catalyst systems having a low pore volume and high surface area can result in a higher melt index and produce an olefin polymer that is easier to process. Unfortunately, it also has been found that decreasing the catalyst system pore volume usually corresponds to a decrease in the catalyst system surface area. These catalyst systems provide polymers with extraordinarily good properties which can only be achieved presently on the commercial scale by making bimodal polymers from two reactors. Thus the first benefit is one of economics. With the magnesia modified silica catalyst we get polymers with fabulous properties more cheaply than our competitors. For our HMW film it is necessary to add a fluoropolymer to process the resin when it is blown into film. So processing is not the real forte for this particular catalyst system. These characteristics are contrary to what is desired for polymer processability.

It is also known that catalyst systems need to be dry for best polymerization productivity and activity. Therefore, catalyst systems are heated and dried prior to use. Unfortunately, heating of catalyst systems can cause problems with catalyst system integrity. For example, if a catalyst system uses a silica-based inorganic oxide support, heat can cause the silica to melt, or sinter, and therefore decrease the surface area of the resultant catalyst system. If alumina is selected as a support material, heating of the alumina can cause the alumina to fracture and create uneven and rough catalyst system particulates which can result in a polymer product that is difficult to handle.

SUMMARY OF THE INVENTION

Therefore, it is an object of the invention to provide an improved silica-containing inorganic oxide catalyst system supports.

It is yet another object of this invention to provide a silica-containing inorganic oxides having a high surface area.

It is a further object of this invention to provide novel silica-containing inorganic oxides that either retain or increase surface area upon heating.

It is a further object of this invention to provide an improved chromium catalyst system.

It is yet another object of this invention to provide a catalyst system suitable for use in polymerization processes.

It is yet another object of this invention to provide a chromium catalyst system that can produce an olefin polymer having a decreased melt index.

In accordance with one embodiment of this invention a process is provided to prepare a magnesium treated silica-containing composition comprising contacting a silica-containing inorganic oxide with a magnesium-containing compound and converting said magnesium-containing compound to a magnesium oxide to produce a magnesium treated silica-containing composition.

In accordance with another embodiment of this invention a process is provided to contact said magnesium treated silica-containing composition with a chromium compound to produce a catalyst system composition.

In accordance with yet another embodiment of this invention a polymerization process is provided using a catalyst system comprising chromium supported on a magnesium treated silica-containing composition.

DESCRIPTION OF THE PREFERRED EMBODIMENTS

In accordance with the present invention, a predominately silica-containing compound is contacted with at least one magnesium compound convertible to the oxide form, and then calcined. The essence of this invention is either precipitating, or doping, magnesium within the pores of a silica-containing compound. Magnesium treatment of the silica-containing compound can be done in accordance with different embodiments of the invention, discussed in detail below. The resultant magnesium treated silica-containing compound can be used as a catalyst system support. As used in this disclosure, the term "support" refers to a carrier for another catalytic component. However, by no means, is a support necessarily an inert material; it is possible that a support can contribute to catalytic activity and selectivity.

Silica-containing compounds employed to prepare polymerization catalyst systems of the present invention must contain a major proportion of silica. Preferred silica-containing compounds contain a substantial proportion of silica, e.g., at least about 50% by weight of silica, preferably at least about 70%, and most preferably 90%, by weight of silica, although still larger proportions of silica can be used. The preferred predominantly silica-containing compounds of the present invention consist essentially of less than about 50% by weight of at least one additional metal oxide such as, for example, alumina, boria, magnesia, titania, zirconia and mixtures of any two or more thereof. Generally, the silica-containing compound employed has a surface area, prior to magnesium treatment, of at least about 10 square meters per gram ($m^2/g$). Preferably, the initial surface area of the silica-containing compound, prior to treatment with a magnesium compound, can be at least 50 $m^2/g$, and most preferably, any silica-containing compound employed is a high surface area silica, i.e., support, with a surface area in excess of about 100 $m^2/g$.

In accordance with one embodiment of this invention, a magnesium salt can be used in a very concentrated aqueous solution and precipitated within the pores of a silica-containing compound. Exemplary magnesium salts include, but are not limited to, magnesium nitrate, magnesium chloride, magnesium acetate, and mixtures thereof The concentrated aqueous solution of the magnesium salt is mixed with the silica-containing compound. Mixing can occur by spraying the aqueous solution containing the magnesium salt onto the silica-containing compound, or by slurrying the aforementioned components together. The concentration of the aqueous magnesium solution can be any amount sufficient to deposit enough magnesium into the pores of the silica-containing compound to increase the surface area of the silica-containing compound and yet, not significantly decrease the pore volume of the silica-containing compound. Usually, concentrations of about 125 millimoles of the magnesium salt per 100 g (mmol/100 g) of support are sufficient. Preferably, concentrations within a range of about 200 to about 700 mmol/100 g of support and most preferably, within a range of 250 to 400 mmol/100 g of support, are preferred. Higher or lower magnesium salt concentrations do not have significant, beneficial effects on surface area.

Contacting conditions of the silica-containing compound and the magnesium compound are not critical. Any temperature and any period of time can be suitable. For convenience, contacting generally is carried out at about room temperature, although higher or lower temperatures, within a range of about 40° F. to about 100° F., can be used. A time period sufficient to allow the support and magnesium compound to come into intimate contact is all that is necessary. Thus, the silica-containing compound and the magnesium salt solution can be brought into contact for as little time as a few seconds to several hours or more, such as, for example, about 5 seconds to about 24 hours, as convenient.

After sufficient contact time, any basic compound can be added to the magnesium/silica-containing compound slurry to precipitate the magnesium within the pores of the silica-containing compound. Exemplary basic compounds include, but are not limited to hydroxides, such as for example, sodium hydroxide, potassium hydroxide, ammonium hydroxide, and mixtures thereof Preferably, the basic compound is ammonium hydroxide ($NH_4OH$), due to availability and ease of use. Heat and increased times can increase effectiveness of introducing and/or precipitating magnesium into the pores of the silica-containing compound. Optionally, the magnesium treated silica-containing support can be heated to temperatures within a range of about 30° C. to about 90° C. and aged for times of up to eight hours. Preferably a temperature range of 50° C. to 60° C. and an aging time of about one hour is sufficient.

Following precipitation of magnesium within the pores of the silica-containing compound, a substantial portion of excess liquid can be removed by any suitable means, such as, for example, decantation, filtration, or any other method known in the art.

After removal of excess liquid, the magnesium-treated silica-containing compound is rinsed with a dilute basic solution, such as, for example, ammonium hydroxide and washed with deionized. The solid then is dried in any manner known in the art to remove any residual liquid. Any suitable means can be employed, such as, for example, oven drying, vacuum drying, alcohol washing, and/or passing of vigorous steam of dry (moisture-free) gas over the magnesium treated silica-containing compound. Preferably, for ease of use, the magnesium treated silica-containing compound is washed with an alcohol. Any alcohol that can remove residual liquid, i.e., water, can be used to wash the magnesium-treated silica-containing compound. Exemplary alcohols include, but are not limited to, methanol, ethanol, propanol and mixtures thereof.

The partially dried, magnesium-treated silica-containing compound then is further dried to remove any remaining absorbed solvent and subjected to calcination conditions. Calcination can be conducted by heating the magnesium treated silica-containing compound in the presence of a dry, oxygen-containing gas, such as, for example, air, under conditions sufficient to convert any magnesium to an oxide. Generally, temperatures within a range of about 300° C. to about 800° C., for a time within a range of about 0.5 to about 20 hours are sufficient. Typically, less time is required at higher calcination temperatures and more time is required at lower calcination temperatures. Preferably, heating occurs at a temperature of around 350° C. to about 450° C. (about 662° F. to about 842° F.) for a period of two to four hours, depending upon the amount of compound being calcined, and then raised to a temperature in the range from 400° C. to 800° C. and held and this temperature from 3 to 15 hours depending on the amount of compound being calcined.

In accordance with a second embodiment of this invention, magnesium treatment can comprise coprecipitating magnesia with a silica-containing compound. This coprecipitation method can be as equally effective in increasing the surface area of silica containing compounds. As used in this disclosure, coprecipitation is preparation of a catalyst system wherein a magnesium compound is coprecipitated with a silica-containing compound and then chromium can be added Another method of coprecipitation can be preparation of a catalyst system wherein a magnesium compound is coprecipitated with a silica-containing compound and a chromium compound.

The magnesium treated silica-containing support, after calcination, must contain a chromium compound in order to produce a polymerization catalyst system. The chromium compound can be added in accordance with any method known in the art. Exemplary methods include starting with a silica/chromium cogel-containing compound and then treating with a magnesium-containing compound. Another exemplary method is to add a chromium compound with the magnesium salt and precipitate both chromium and magnesium within the pores of the silica-containing compound. Another exemplary method is embodiment of the invention comprises adding chromium in conjunction with an alcohol solution prior to calcinations of the silica-containing support. A further embodiments of this invention is to add the chromium after the support has been calcined. Addition of chromium also can be done after the magnesium-treated silica-containing compound has been dried by combining additional magnesium with a solution of a chromium compound.

Commonly used polymerization cocatalysts can be used, if desired, but are not necessary. Exemplary cocatalysts include, but are not limited to, metal alkyl, or organometal cocatalysts, i.e., alkyl boron and/or alkyl aluminum compounds. The term "metal" in organometal is intended to include boron. Often these cocatalysts can alter melt flow characteristics (melt index or high load melt index) of the resultant polymer. While not wishing to be bound by theory, it is believed a cocatalyst can act as a scavenger for catalyst system poisons.

If the cocatalyst is an alkyl boron compound, trihydrocarbylboron compounds are preferred and trialkyl boron compounds are most preferred. Preferably, the alkyl groups have from about 1 to about 12 carbon atoms and preferably, from 2 to 5 carbon atoms per alkyl group. Trialkyl boron compounds, such as, for example, tri-n-butyl borane, tripropylborane, and triethylboran (TEB) are preferred cocatalysts because these compounds are effective agents to improve polymer properties, such as, for example, to reduce melt flow and retard polymer swelling during polymerization. Other suitable boron compounds include trihydrocarbyl boron compounds broadly; triaryl boron compounds, such as, for example, triphenylborane; boron alkoxides, such as, for example, $B(OC_2H_5)_3$; and halogenated alkyl boron compounds, such as, for example, $B(C_2H_5)Cl_2$. By far, the most preferred cocatalyst is triethylboran, for the reasons given above.

Other suitable cocatalysts can be are aluminum compounds of the formula $AlR'_nX_{3-n}$, where X is a hydride or halide, R' is a 1 to 12 carbon atom hydrocarbyl radical and n is an integer of 1 to 3. Triethylaluminum (TEA) and diethylaluminum chloride (DEAC) are particularly suitable.

A cocatalyst, when used, usually can be used in an amount within a range of about 1 to about 20 parts per million (ppm), or milligrams per kilogram (mg/kg), based on the mass of the diluent in the reactor. Preferably, cocatalyst is used in an amount within a range of 1 to 12 mg/kg, for cost effectiveness and best resultant polymer properties. Expressed in other terms, a cocatalyst can be present in an amount so as to give an atom ratio of cocatalyst metal to chromium within a range of about 0.5:1 to about 10:1, preferably 2:1 to 8:1.

The cocatalyst either can be premixed with a catalyst system or added as a separate stream to the polymerization zone, the latter being preferred.

Reactants and Reaction Conditions

The polymers produced in accordance with the process of this invention are homopolymers of ethylene and copolymers of ethylene and higher alpha-olefin comonomers. Preferably, the ethylene concentration in the polymerization reactor is within a range of from about 2 weight percent to about 20 weight percent, based on the total liquid contents of the reactor. Most preferably, the ethylene concentration in the polymerization reactor is within a range of from about 4 to about 15 weight percent. Measured in another manner, ethylene concentration in the polymerization reactor flash gas is within a range of from about 5 weight percent to about 12 weight percent. Most preferably, the ethylene concentration in the polymerization reactor flash gas is within a range of from about 6.5 to about 10 weight percent. While ethylene concentration does not significantly affect the molecular weight of the resultant polymer, higher or lower ethylene concentration can effect catalyst activity.

The alpha-olefin comonomers used in the present invention must be selected from the group consisting of 1-butene, 1-hexene, and mixtures thereof in order to produce a copolymer with desirable properties as well as ease of use in a loop/slurry polymerization reaction process. The most preferred comonomer is 1-hexene to produce a copolymer with the best product properties. If a comonomer is present during polymerization, the comonomer concentration in the polymerization reactor is within a range of from about 0.5 to about 20 mole percent. Most preferably, comonomer is present within a range of about 1 to about 15 weight percent. As used in this disclosure the term "polymer" includes both homopolymers and copolymers.

Polymerization can be carried out in any manner known in the art, such as gas phase, solution or slurry conditions, to effect polymerization. A stirred reactor can be utilized for a batch process, or the reaction can be carried out continuously in a loop reactor or in a continuous stirred reactor.

A preferred polymerization technique is that which is referred to as a particle form, or slurry, process wherein the temperature is kept below the m temperature at which polymer goes into solution. Such polymerization techniques are well known in the art and are disclosed, for instance, in Norwood, U.S. Pat. No. 3,248,179, the disclosure of which is hereby incorporated by reference.

The preferred temperature in the particle form process is within a range of about 185 to about 230° F. (about 85 to 110° C.), although higher or lower temperatures can be used. Two preferred polymerization methods for the slurry process are those employing a loop reactor of the type disclosed in Norwood and those utilizing a plurality of stirred reactors either in series, parallel or combinations thereof wherein the reaction conditions can be different in the different reactors.

The molecular weight of the polymer can be controlled by various means known in the art such as adjusting the temperature (higher temperature giving lower molecular weight) and introducing, or varying the amount of, hydrogen to alter the molecular weight, or varying the catalyst compounds.

Polymer Characteristics

Polymers produced in accordance with this invention have increased density, broadened molecular weight distribution especially on the high molecular weight end, decreased MI, and decreased HLMI, as compared to polymers prepared from conventional supported chromium catalyst systems be they chromium on silica or chromium on a silica-titania matrix. It is believed that the uniqueness of this catalyst system is derived from the formation of a catalyst with a large surface area and unique polymerization sites. These characteristics can produce a polymer, or resin, which has an increase in the molecular weight region which promotes good properties in resins while not enhancing the very high molecular weight tail or long chain branching which characterizes chromium based catalysts. While not wishing to be bound by theory, it is believed that polymers produced in accordance with this invention are unique in that the polymer chains are intertwined in each polymer particle; each polymer particle can be considered "all-inclusive" as to polymer characteristics. This catalyst system composition most preferably is applicable for use with ethylene polymerization.

The resultant ethylene polymer usually can have a density within a range of about 0.91 to about 0.975 g/cc, and preferably within a range of about 0.945 to about 0.96 g/cc. The polymer melt index (MI) usually is within a range of about 0.015 to about 0.7 g/10 min and preferably within a range of about 0.02 to about 0.5 g/10 min. The polymer high load melt index (HLMI) of the resultant polymer usually is within a range of about 1 to about 175 g/10 min and preferably within a range of about 4 to about 70 g/10 min. The shear ratio (HLMI/MI) is usually within a range of about 40 to about 250, and preferably within a range of about 50 to 200. Polymers having characteristics within the given ranges are especially useful for applications of blow molding and/or film production.

The uniqueness of the disclosed and claimed catalyst system is the ability to make polymers with a molecular weight distribution (MWD) that promotes good properties particularly dart impact in high molecular weight (HMW) film applications. While not wishing to be bound by theory, it is believed that these property improvements result from the lessening of long chain branching (LCB) and/or the reduction in HMW tails as a result of the increased surface area.

A further understanding of the invention and its advantages is provided by the following examples.

EXAMPLES

The following Examples illustrate various aspects of the invention. Data are included for each example about polymerization conditions, as well as the resultant polymer. All chemical handling, including reactions, preparation and storage, was performed under a dry, inert atmosphere (usually nitrogen). In general, catalyst systems used for polymerization in the Examples were prepared as described in this application.

All laboratory polymerization tests were done in a steam-jacketed, 2.65 liter, stirred, stainless steal vessel. In a typical run, 40 to 100 mg of catalyst system were added to the reactor followed by hydrogen, if used, then 600 ml of isobutane. If a cocatalyst, such as a metal alkyl, was utilized, catalyst was flushed into the reactor with an additional 600 ml of isobutane. When hexene-1 or any other comonomer was used then comonomer was added just before the system was pressured to 550 psig with ethylene. Ethylene was added on demand as the reaction proceeds.

Pilot plant polymerizations were done in a 23-gallon slurry loop reactor at a production rate of approximately 25 pounds of polymer per hour.

General procedures for preparation of catalyst systems in the following Examples is as follows. This also is referred to as an AESOP (Alkaline Earth Standard Oxide Poregel) preparation. First, a concentrated solution of a magnesium salt is prepared by dissolving the salt and chromium(III) nitrate in a minimum amount of deionized water. This solution, called a "syrup," was heated to about 50 to about 55° C. to dissolve the salts. Chromium was added in the amount of one weight percent of the MgO formed from the dehydration of the $Mg(OH)_2$ to ensure that some chromium will be available to bond to the surface of the MgO.

Then, the syrup and ammonium hydroxide were sprayed onto the support.

Alternatively, only the syrup can be sprayed onto the support and then the support comprising the sprayed syrup can be combined with an aqueous solution of ammonium hydroxide. This technique is preferred when the support has insufficient pore volume to contain both the syrup and required volume of ammonium hydroxide. If this alternative method is used, it is possible to have up to a 30% loss of MgO in the final magnesium-treated silica-containing support.

Preferably, the catalyst system is aged at temperatures within a range of about 50° C. to 60° C. in 0.7 to 1.0 molar ammonium hydroxide ($NH_4OH$) solution for about one hour. The $NH_4OH$ is removed and the catalyst system is washed two to three times in water heated to about 50 to 60° C. for about 30 minutes and filtered. Then, one to three n-propanol washes followed the water washes.

The catalyst system was dried in a vacuum oven for at least 24 to about 48 hours at about 120° C. to 125° C. More than 95% of the volatile material was lost during the first 10 to 15 hours of drying. The catalyst was kept in a vacuum oven until no further weight loss was observed, about one day. Although the amount of volatile material lost during the second day of drying is less than 5 wt %, it is believed that this additional drying time can avoid poor catalyst system activation. The dried catalyst was screened through a 35-mesh (0.50 mm) screen and stored. Catalyst systems generally were prepared as described above. Specific variations to the above-discussed preparation are listed below.

Analyses of the resultant polymers were conducted according to the following procedures:

Density (g/ml)—ASTM D 1505–68 and ASTM D 1928, Condition C. Determined on a compression molded sample, cooled at about 15° C. per minute, and conditioned at room temperature for about 40 hours.

Fluff Bulk Density (g/ml)—ASTM D 1895, the apparent density test.

High Load Melt Index (HLMI)(g/10 min)—ASTM D 1238. Determined at 190° C. with a 21,600 gram weight.

Melt Index (MI)(g/10 min)—ASTM D 1238. Determined at 190° C. with a 2,160 gram weight.

Surface Area and Pore Volume. Measured by BET nitrogen sorption using a Quantachrome Corporation, Autosorb-6 b instrument.

Throughout the Examples, "est" means the weight percent estimated from ingredients of the preparation, assuming 100% recovery.

Example 1

Run 101: 10 to 15 g of 964 Magnapore®, Lot 2633, obtained from W. R. Grace of Baltimore, Md. was activated by calcination in air at a rate of approximately 6° C./min to a hold temperature of 593° C. and held at this temperature for about three hours. Airflow was 1.2 to 1.6 SCFH at ambient temperature. After cooling, the system was flushed with nitrogen to remove all traces of air. The catalyst was stored under nitrogen until use. This catalyst is designated as a control and called 964 Magnapore®.

Run 102: 1025 g (4.0 moles) of $Mg(NO_3)_2 \cdot 6H_2O$ and 13.3 g of $Cr(NO_3)_3 \cdot 9H_2O$ were dissolved in 400 ml of deionized water with stirring and heating. The warm syrup was sprayed onto 800 g of 964 Magnapore® (Lot 2633) followed by 670 ml. of conc $NH_4OH$. The mixture was divided into 2 equal portions with each being aged for 1 hour at about 50 to 60° C. in 2.6 liters of deionized water containing 135 ml. of conc $NH_4OH$. The solids were filtered and then slurried in 2.6 liters of water at about 50 to 60° C. for 30 min. This wash process was repeated. Each batch then was washed three times in 2.6 liters of 50 to 60° C.) n-propanol for 30 minutes, filtering after each wash. Both batches were dried in vacuum oven at about 120 to 130° C. for about 48 hours. Fifteen grams of this catalyst was calcined in air heated at a rate of 1° C./min to 400° C. and held there for two hours. Heating then was continued at the same rate to a final temperature of 593° C. and held there for about three hours. The activated catalyst was recovered and stored under nitrogen until use. This catalyst system is designated as AESOP preparation of 964 Magnapore®/MgO catalyst system.

Run 103: A methanolic solution containing 28 g of $Mg(NO_3)_2 \cdot 6H_2O$ was added to 40 g of 964 Magnapore® (Lot 2633). This was dried in vacuum oven at about 110° C. for about 16 hours. 0.34 g of $Cr(NO_3)_3 \cdot 9H_2O$ in methanol was added to the dried solid and then dried again. To this twice-dried solid was added a methanolic solution of 14.2 g of $Mg(NO_3)_2 \cdot 6H_2O$ and 0.21 g $Cr(NO_3)_3 \cdot 9H_2O$ and re-dried in the vacuum oven at about 110° C. for about 72 hours. The resulting solid was calcined as described in Run 102. In a similar fashion, catalysts were prepared from the chloride and acetate salts of magnesium. These catalyst systems are described as impregnation of the 964 Magnapore®, i.e., 964 Magnapore®/Mg($NO_3$)$_2$, 964 Magnapore®/Mg($C_2H_3O_2$)$_2$; and 964 Magnapore®/$MgCl_2$. Properties of the catalyst systems are provided in Table 1.

TABLE 1

| Run Number | Catalyst | Activation Temperature (° C.) | Surface Area (m²/g) | Pore Volume (cm³/g) | Wt. % MgO[a] |
|---|---|---|---|---|---|
| 101 | 964 Mag | | 570 | 2.3 | 0.0 |
| 102-a | 964 Mag/MgO | 593 | 711 | 1.14 | 15.6 |
| 102-b | 964 Mag/MgO | 649 | 701 | 1.5 | 18est |
| 102-c | 964 Mag/MgO | 760 | 590 | 1.3 | 18est |
| 103-a | 964 Mag/Mg($NO_3$)$_2$ | 593 | 388 | 1.04 | 12.8 |
| 103-b | 964 Mag/Mg($C_2H_3O_2$)$_2$ | 593 | 420 | 1.32 | 13.4 |
| 103-c | 964 Mag/$MgCl_2$ | 593 | 392 | 1.15 | 12.9 |

[a]Weight percent oxides were calculated in their most common forms from x-ray fluorescence spectrometric results of the elements.

Example 2

This example illustrates other examples of the enhancement of surface area by using the AESOP procedure as described in Example 1. Designations 952, HA30W, HPVSiO2, and XPO-7003 are different silicas made by the Davison Catalyst Division of W. R. Grace Co. of Baltimore, Md.

TABLE 2

| Run No. | Support Matrix | Catalyst Description | Activation Temp. (° C.) | Surface Area (m²/g) | Pore Volume (cm³/g) | Wt. % MgO | Wt. % TiO₂ |
|---|---|---|---|---|---|---|---|
| 201 | Silica | 952 SiO₂ | | 300 | 1.5 | 0 | 0 |
| 202 | Silica | 952 SiO₂/MgO | 400 | 461 | 1.29 | 14.6 | 0 |
| 203 | Silica-Titania | 963 Magnapore ® | 649 | 491 | 2.35 | 0 | 3.4 |
| 204 | Silica-Titania | 963 Mag/MgO | 704 | 589 | 1.57 | 17.4 | 3.4 |
| 205 | Silica | HA30W | 593 | 479 | 1.55 | 0 | 0 |
| 206 | Silica | HA30W/MgO | 593 | 638 | 1.18 | 14.1 | 0 |
| 207 | Silica | HA30W/MgO/TiO₂ | 593 | 599 | 1.29 | 15.3 | 0 |
| 208 | Silica | HPVSiO₂ | 400 | 277 | 2.58 | 0 | 0 |
| 209 | Silica | HPVSiO₂/MgO | 400 | 535 | 1.68 | 14.6 | 0 |
| 210 | Silica | HPVSIO₂/TiO₂ | 593 | 268 | 2.26 | 0 | 9.1 |
| 211 | Silica | HPVSiO₂/MgO/TiO₂ | 593 | 482 | 1.47 | 14.6 | 9.7 |
| 212 | Silica | XPO-7003 | | | | | |
| 213 | Silica | XPO-7003/MgO | 593 | 461 | 1.29 | 14.4 | |
| 214 | Silica | XPO-7003/MgO/TiO₂ | 593 | 643 | 1.29 | 12.6 | 8.5 |

Example 3

This Example demonstrates the improvement of catalyst system support and catalyst system surface area from cogellation of silica and a magnesium compound to form a catalyst system support.

Run 301: 64 g Mg(NO₃)₂.6H₂O were dissolved in 150 ml. deionized water to which 2 ml conc HNO3 had been added. While stirring continuously, 149 ml of tetraethoxysilane (Strem, 98%, density=0.9356 g/cc) were added over a period of 45 minutes. To this mixture were added dropwise a solution containing 100 ml of water and 10 ml of concentrated NH₄OH. Some white precipitate formed during the addition of the base. The mixture gelled after the addition of 37 ml of the dilute NH₄OH. The gel was aged in 2 liters of water containing 25 ml of concentrated NH₄OH at 80° C. for about one hour after which it was filtered and washed twice at 80° C. for about 30 minutes with two two-liter portion of water containing 5 ml of conc NH₄OH. The gel is then was washed twice with n-propanol at about 70° C. for about 30 min. After a final filtration, the solid was recovered and dried in a vacuum oven at about 110° C. for about 24 to 72 hours. 1 wt % chromium from a methanol solution of Cr(NO₃)₃.9H₂O was added to a 20 g portion of the catalyst and re-dried overnight at about 110° C. under vacuum. The catalyst was sieved through a 35-mesh screen and calcined in the manner described in Run 102.

Run 302: Catalyst preparation, work-up and calcination were as described in Run 301, except 100 ml of tetraethoxysilane was used.

Run 303: Catalyst preparation, work-up and calcination were as described in Run 301, except 50 ml of tetraethoxysilane was used.

Run 304: Catalyst preparation, work-up and calcination were as described in Run 301, except that a magnesium salt was not used. Gelation occurred after the addition of 30 ml of dilute NH₄OH solution. Table 3. Examples illustrating the enhancement of catalyst surface area from the cogelation of silica and magnesia.

TABLE 3

| Run No. | Catalyst Description | Activation Temperature (° C.) | Surface Area (m²/g) | Pore Volume (cm³/g) | Wt. % MgO |
|---|---|---|---|---|---|
| 304 | SiO₂/MgO | 593 | 649 | 1.54 | 11.6 |
| 305 | SiO₂/MgO | 593 | 676 | 1.18 | 16.7 |
| 306 | SiO₂/MgO | 593 | 712 | 1.45 | 25.2 |
| 307 | SiO₂ | 593 | 424 | 1.95 | 0 |

The uniqueness of the catalyst is illustrated by a comparison Examples 1, 2 and 3.

Example 4

The enhancement of surface areas of a variety of supports by means of the porgelation of magnesium hydroxide followed by calcination to form MgO apparently is a unique phenomena among the alkaline earth oxides as illustrated by data of Table 4.

Run 401: 10 to 15 g 964 Magnapore® (Lot 2622) were calcined at about 704° C. for about three hours as described in Run 101. This catalyst system is designated as a control, 964 Magnapore®.

Run 402: 120 g (0.25 moles) of Mg(NO₃)₂.6H₂O were dissolved in 100 ml of deionized water. Then, 0.91 g of Cr(NO₃)₃₋₉ H₂O were dissolved in 104 ml of this magnesium salt solution and sprayed onto 50 g of 964 Magnapore®. The solid mixture was added to a solution containing 80 ml of conc NH₄OH and 100 ml H₂O, after which it was washed three times with two-liter portions of about 80 to 90° C. water. This was followed by two two-liter n-propanol washes as described in Run 102. A solid was recovered and dried in vacuum oven at 100° C. for about 48 hours. Then, 15 g was calcined by heating in air at a rate of 1° C./min to 400° C., held there for about two hours. Heating then was continued at the same rate to the final temperature of 704° C. and held there for about three hours. These catalysts are designated as 964 Mag/MgO.

Run 403: 16.5 g of Ca(NO₃)₂.4H₂O and 0.639 g Cr(NO₃)₃.9H₂O of were dissolved in deionized water. This solution was sprayed onto 50 g of 964 Magnapore®. The damp solid was added to a solution containing 67 ml of concentrated NH₄OH and 100 ml H₂O. Rinsing, drying, and calcination were as described in Run 402 This catalyst system is designated as 964 Mag/CaO.

Run 403: 93 g of Sr(NO₃)₂.4H₂O were dissolved in 125 ml of deionized water. Then, 1.58 g of Cr(NO₃)₃.9H₂O were dissolved in 104 ml of this solution and sprayed onto 50 g of 964 Magnapore®. The solid mixture was added to a solution containing 57 ml of conc NH₄OH and 100 ml H₂O. Rinsing, drying, and calcination were as described in Run 402. This catalyst system is described as 964 Mag/SrO.

Run 405: 15.3 g of Ba(CH3CO2)2.4 H₂O and 0.707 g Cr(NO₃)₃.9H₂O were dissolved in deionized water. This solution was sprayed onto 50 g of 964 Magnapore® after which the solid mixture was added to a solution containing 54 ml of conc $NH_4OH$ and 100 ml $H_2O$. Rinsing, drying, and calcination were as described in Run 405.

The data in Table 4 shows the properties of AESOP catalyst systems based on a 964 Magnapore® matrix.

TABLE 4

| Run No | Catalyst Description | Activation Temperature (° C.) | Surface Area (m²/g) | Pore Volume (cm³/g) | Wt.% MgO$^a$ | Wt. % TiO$_2$ |
|---|---|---|---|---|---|---|
| 401 | 964 Mag | 704 | 593 | 2.26 | 0.0 | 7est |
| 402 | 964 Mag/MgO | 704 | 701 | 1.50 | 18est | 5est |
| 403 | 964 Mag/CaO | 704 | 415 | 1.84 | 6.6 | 5.4 |
| 404 | 964 Mag/SrO | 704 | 339 | 1.54 | 15.4 | 7.1 |
| 405 | 964 Mag/BaO | 704 | 323 | 1.35 | 11.4 | 6.4 |

Example 5

Poregelation of MgO (AESOP preparation) into a commercial chromium polymerization catalyst makes a unique polyethylene as shown by the data in Table 5. The data in Table 5 compares poregellation techniques with impregnation techniques of a magnesium compound. This uniqueness becomes apparent when the molecular weight and tau-eta (tau-eta is derived from the Carreau-Yasuda Model of curve fitting dynamic rheology data at 190° C.) parameters are compared. Tau-eta is related to the molecular weight and molecular weight distribution of the polymer. The higher Mw and broader the MWD on the high molecular weight end the larger is tau-eta. Tau-eta also increases as the amount of long chain branching in the polymer increases. Thus, the decrease in tau-eta at a higher $M_w$ for a resin made by the AESOP catalyst can be interpreted as less long chain branching and/or less very high molecular weight molecules, i.e. those greater than several million.

Polymerization reactions were carried out to an activity of 2500 gPE/gcat in the presence of 2 ppm TEB, 2.0 wt % 1-hexene, 0.2 mole percent of hydrogen and a reactor pressure of 550 psig.

TABLE 5

| Run No. | Catalyst Type | Wt. % MgO | Wt. % TiO$_2$ | Reaction Temp. ° C. | Activity gPE/gcat/hr | HLMI g/10 min | Mw ×10$^{-3}$ | Tau-eta (s) |
|---|---|---|---|---|---|---|---|---|
| 101 | 964 Mag | 0 | 7est | 80 | 5490 | 7.5 | 348 | 63 |
| 102 | 964 Mag/Mg (NO$_3$)$_2$ | 12.8 | 6.1 | 90 | 3200 | 5.7 | 332 | 21 |
| 103 | 964 Mag/MgO | 12.3 | 5.5 | 100 | 3880 | 5.6 | 410 | 7 |

Example 6

Uniqueness of AESOP catalysts derives from the increase in the molecular weight region centered around 500,000–1,000,000 as illustrated by the following SiO$_2$/MgO cogel data of Table 6. The data in Table 6 show resins made from silica magnesia cogels with varying amounts of MgO.

Polymerization reactions were carried out to an activity of 2500 g/g in the presence of 4.0 wt % hexene-1 and at a reactor pressure of 550 psig.

TABLE 6

| Run No. | Catalyst Type | Wt. % MgO | Reaction Temp. ° C. | Activity gPE/gcat/hr | Density g/cm³ | HLMI g/10 min | Mw ×10$^{-3}$ | $M_w/M_n$ |
|---|---|---|---|---|---|---|---|---|
| 601 | SiO$_2$ | 0 | 98 | 1920 | 0.922 | 6.4 | 294 | 19 |
| 602 | SiO$_2$/MgO | 11.6 | 98 | 3180 | 0.934 | 1.8 | 421 | 21 |
| 603 | SiO$_2$/MgO | 16.7 | 98 | 2160 | 0.934 | 0.6 | 429 | 19 |
| 604 | SiO$_2$/MgO | 25.2 | 98 | 2430 | 0.933 | 0.5 | 551 | 21 |

Example 7

Uniqueness of the MgO AESOP as compared to other Group II to oxides is illustrated by the data in Table 7. The data in Table 7 show 20 HLMI resins made from the poregelation of alkaline earth oxides into 964 Magnapore® starting material. The $M_w$ of 964 Mag/MgO is greater than that of the control but with a much smaller tau-eta value. $M_w$ for CaO and SrO AESOPs of 964 Magnapore® are less than that of the control for an equivalent HLMI. The retention of $M_w$ while having a very low tau-eta may reflect the diminishing of the very high molecular weight components and/or lessening of long chain-branching typically present in conventional supported chromium catalyst systems.

Laboratory polymerizations were run to an activity of 2500 gPE/gcat with temperature and pressure regulated to achieve the target HLMI of 20. All reactions were done in the presence of 1 wt. % hexene-1 but without hydrogen or added cocatalyst.

TABLE 7

| Run No. | Catalyst Type | Wt. % MO | Temp. ° C. | Pres. psig | Activity g/g/hr | HLMI g/10 min | HLMI/ MI | Mw ×10$^{-3}$ | Mw/ Mn | Tau-eta, (s) |
|---|---|---|---|---|---|---|---|---|---|---|
| 701 | 964 Mag | 0 | 88 | 550 | 3810 | 20.8 | 125 | 189 | 30 | 6.91 |
| 702 | 964 Mag/MgO | 13est | 102 | 400 | 3050 | 18.7 | 72 | 211 | 12 | 0.91 |
| 703 | 964 Mag/CaO | 7est | 97 | 500 | 4850 | 20.9 | 56 | 145 | 8 | 0.19 |
| 704 | 964 Mag/SrO | 15est | 100 | 450 | 1960 | 21 | 44 | 132 | 7 | 0.08 |

Example 8

The unique HMW peak in the molecular weight distribution appears to give resin properties that provide advantages in the film market as illustrated by the data in Table 8. The data in Table 8 provide a comparison of film properties between a commercial high molecular weight (HMW) bimodal film made in dual reactors versus that made from the poregelation of MgO onto either 964 Magnapore® or HA30W.

TABLE 8

| Run | 801 | 802 | 803 |
|---|---|---|---|
| Catalyst | 964 Mag/MgO | HA30W/MgO/TiO$_2$ | Lynx ®-100$^a$ |
| Activation Temp., ° C. | 593 | 593 | |
| Wt. % MgO | 13est | 15.3 | |
| Wt. % TiO$_2$ | 5est | 9.4 | |
| SA, m$^2$/g | 678 | 599 | |
| PV, cm$^3$/g | 1.2 | 1.3 | |
| Resin Properties | | | |
| Density, g/cc | 0.949 | 0.948 | 0.951 |
| HLMI, g/10 mins | 6.5 | 5.8 | 8.0 |
| HLMI/MI | 130 | 142 | 127 |
| M$_w$ × 1000 | 352 | 415 | 303 |
| M$_w$/M$_n$ | 30 | 36 | 32 |
| Film Properties | | | |
| Tau | 5 | 10 | 5 |
| Dart Impact | 390 | 354 | 372 |
| MD | 34 | 21 | 33 |
| TD | 184 | 84 | 143 |
| Reactor Conditions | | | |
| Reactor | Single Slurry Loop | Single Slurry Loop | Dual Reactors |
| Ethylene, mol % | 7.6 | 9.5 | ? |
| Hexene-1, mol % | 0.03 | 0.10 | ? |
| Hydrogen, mol % | 0.54 | 0.47 | ? |
| Temperature, ° C. | 106 | 106 | ? |
| Pressure, psig | 560 | 560 | ? |
| TEB, ppm | 3.2 | 4.2 | ? |

$^a$Lynz ®-100 is a titanium-magnesium chloride type catalyst commercially available from Catalyst Resources, Inc.

While this invention has been described in detail for the purpose of illustration, it is not to be construed as limited thereby but is intended to cover all changes and modifications within the spirit and scope thereof.

That which is claimed is:

1. A process for producing a polyethylene comprising contacting ethylene under suitable polymerization conditions with a catalyst system comprising a chromium-containing catalyst prepared by contacting a silica-containing inorganic oxide with a magnesium compound, contacting the resulting combination with a base to form a magnesium hydroxide, drying the resulting combination, and then calcining the dried product in the presence of oxygen, wherein the amount of magnesium compound is such that the resulting catalyst has a higher surface area than the silica-containing inorganic oxide starting material, wherein the chromium in the catalyst is provided by (a) employing as the silica-containing inorganic oxide a silica/chromium cogel, (b) adding a chromium compound with the magnesium compound, (c) adding a chromium compound to the dried magnesium silica combination prior to the calcinations, (d) adding a chromium compound after the support has been calcined, or (e) adding a chromium compound after the drying step by combining additional magnesium compound with a solution of a chromium compound.

2. A process according to claim 1 wherein the chromium containing catalyst contains chromium that has been oxidized and the silica-containing inorganic oxide is selected from the group consisting of silica, silica-alumina, phosphated silica, silica-titania, coprecipitated silica/titania, fluorided/silated alumina, and mixtures thereof.

3. A process according to claim 2 wherein the silica-containing inorganic oxide consists essentially of silica.

4. A process according to claim 1 wherein the calcination is carried out at a temperature in the range of about 300 degrees C. to about 800 degrees C. and the reaction between the base and the magnesium-containing compound is carried out at a temperature in the range of about 30 degrees C. to about 90 degrees C.

5. A process according to claim 4 wherein the calcination is carried out at a temperature in the range of about 500 to 800 degrees C. such that at least a portion of the chromium component is converted to the hexavalent state.

6. A process according to claim 4 wherein the catalyst is prepared by spraying a aqueous mixture of a magnesium salt and water onto the silica-containing inorganic oxide, then contacting that product with aqueous ammonium hydroxide at a temperature in the range of about 30 to about 90 degrees C.

7. A process according to claim 6 wherein the aqueous mixture of the magnesium salt contains a chromium compound.

8. A process according to claim 6 wherein about 100 millimoles to 700 millimoles of the magnesium compound is employed per 100 grams of the silica-containing inorganic oxide.

9. A process according to claim 4 wherein ethylene is polymerized in the presence of a comonomer selected from 1-butene, 1-hexene, or mixtures thereof.

10. A process according to claim 4 wherein the polymerization is carried out under particle form polymerization conditions in a continuous loop reactor at a temperature in the range of about 85 to about 120 degrees C. in an isobutane liquid diluent.

11. A process according to claim 10 wherein the polymerization is carried out in the presence of 1-hexene comonomer and a triethylborane.

12. A process according to claim 10 wherein the polymerization is carried out in the presence of 1-hexene without the employment of any cocatalyst for the chromium-containing catalyst.

* * * * *